June 27, 1939.  H. ROSSEN  2,164,085
SELF-PROPELLED ELECTRIC IRON
Filed Aug. 24, 1936  4 Sheets-Sheet 2
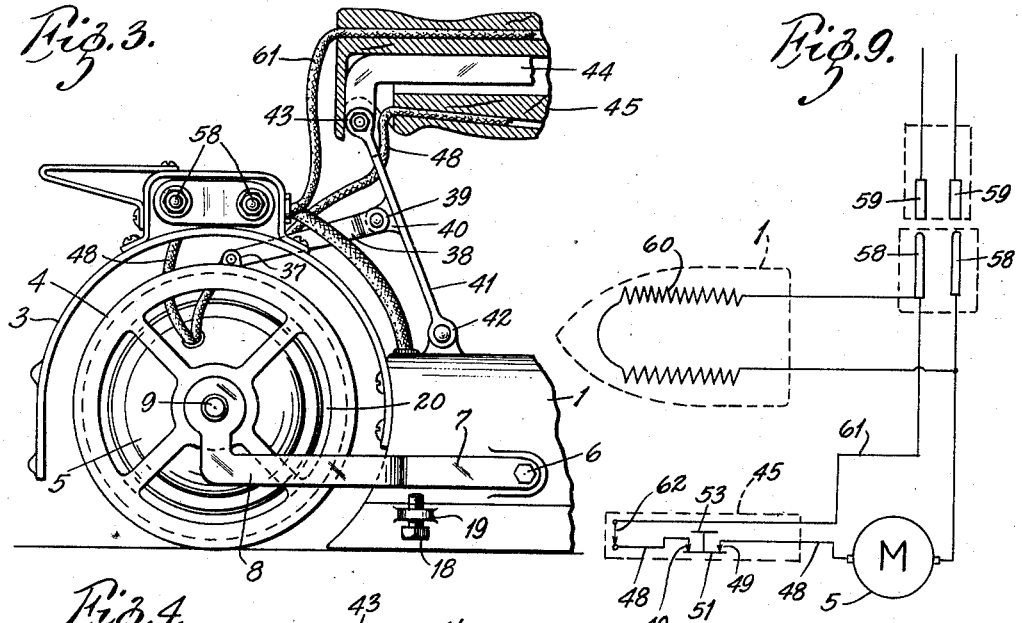
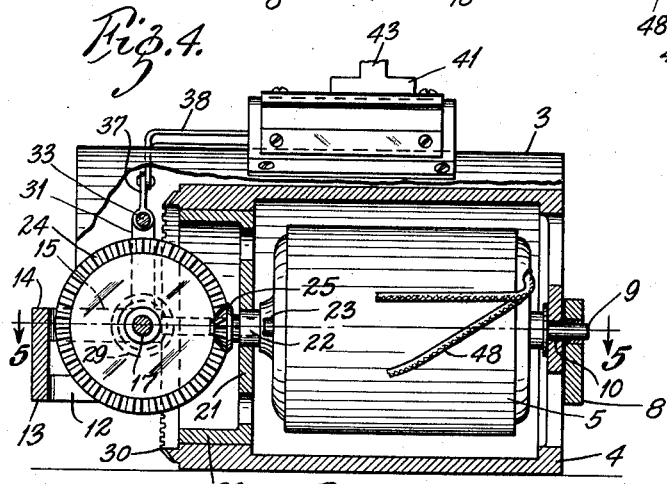
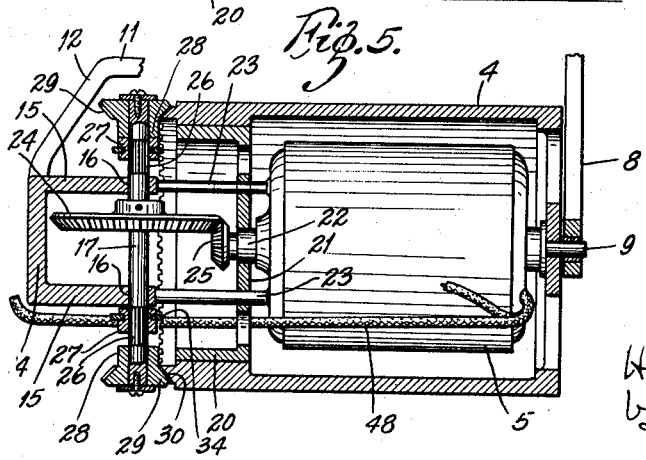
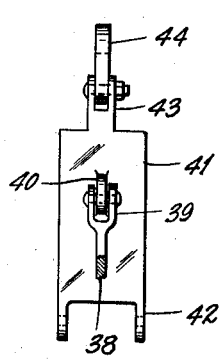
INVENTOR.
Harris Rossen,
by Cau Tau & Gravely,
HIS ATTORNEYS

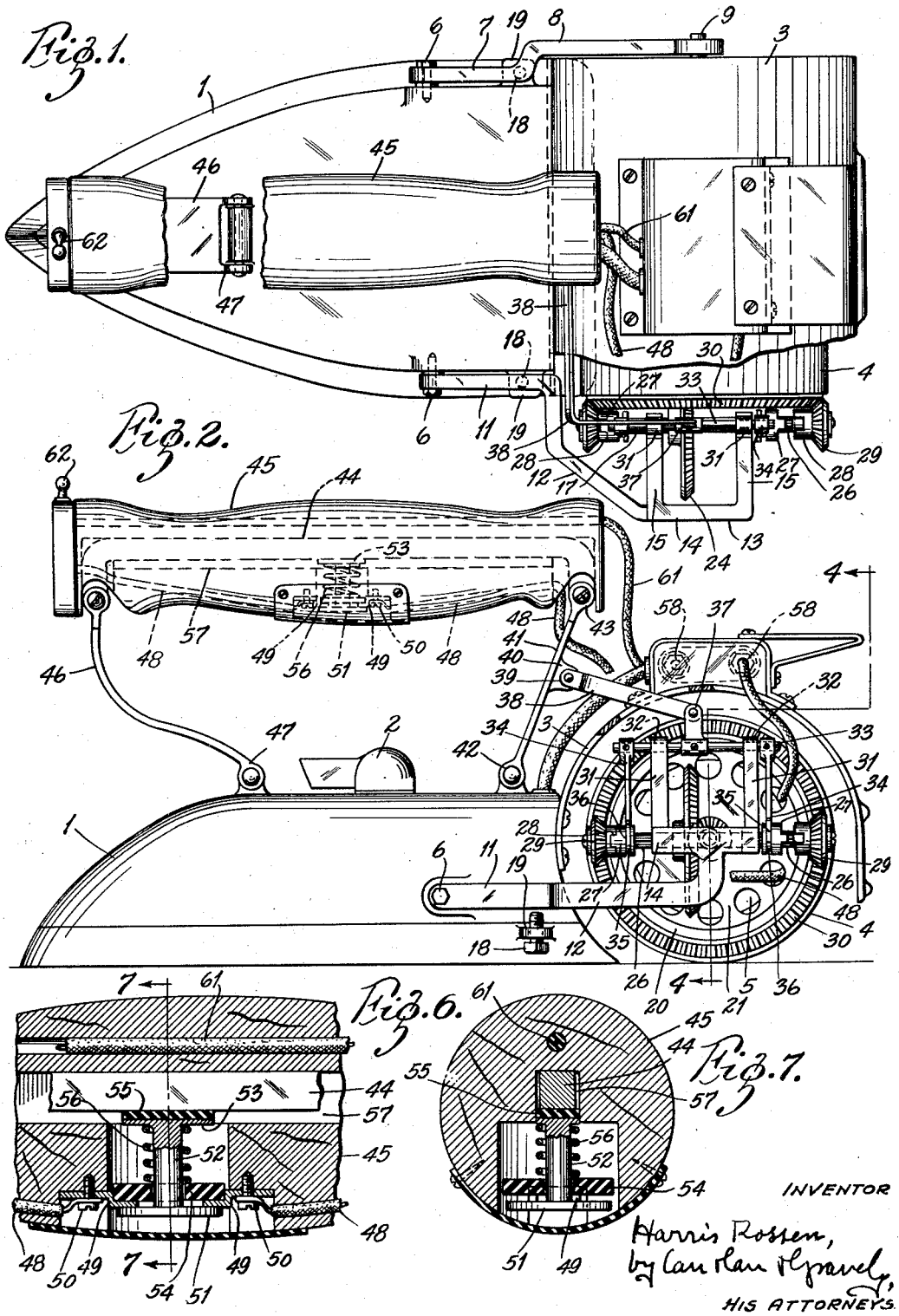

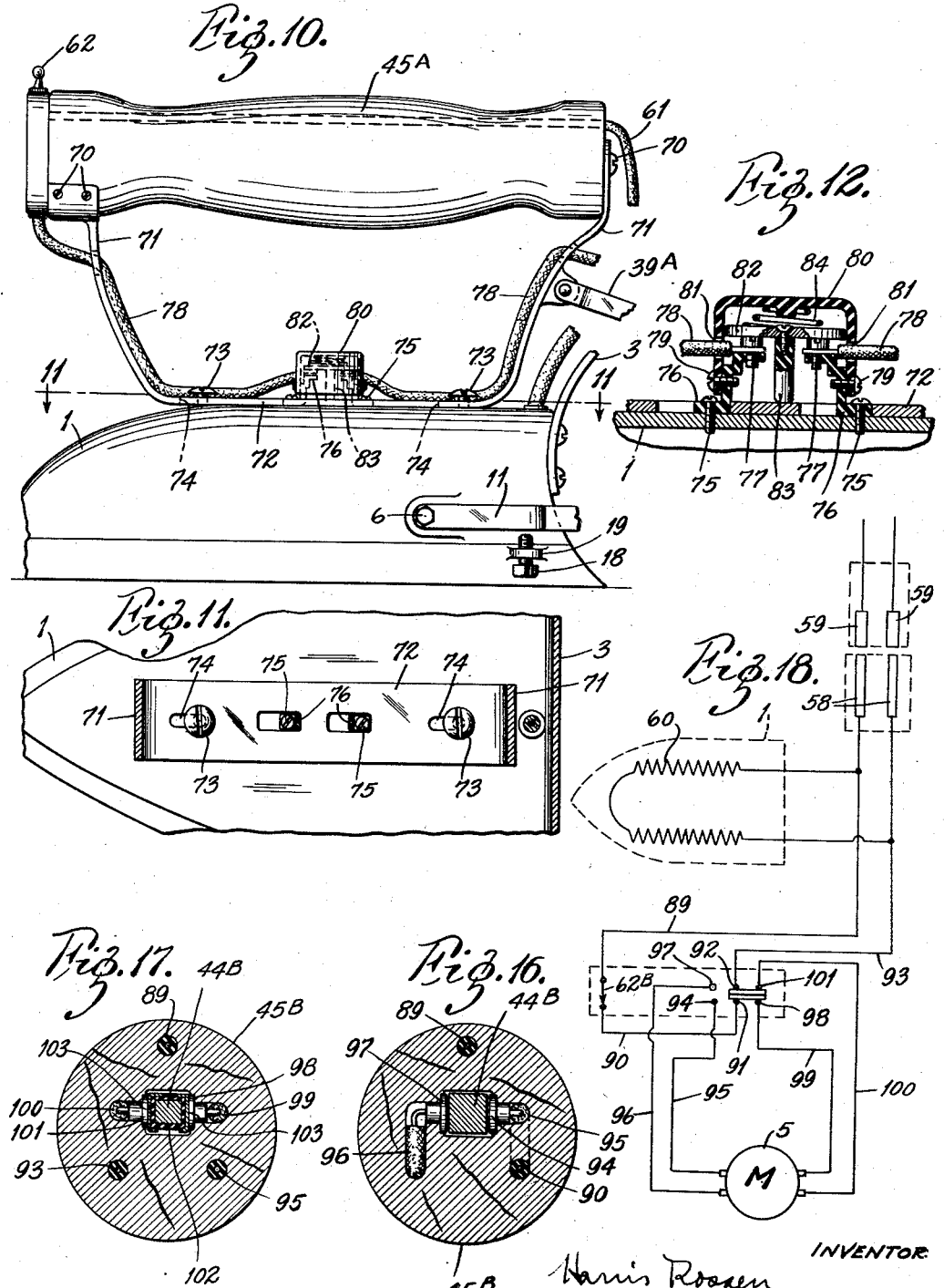

June 27, 1939.  H. ROSSEN  2,164,085
SELF-PROPELLED ELECTRIC IRON
Filed Aug. 24, 1936  4 Sheets-Sheet 4
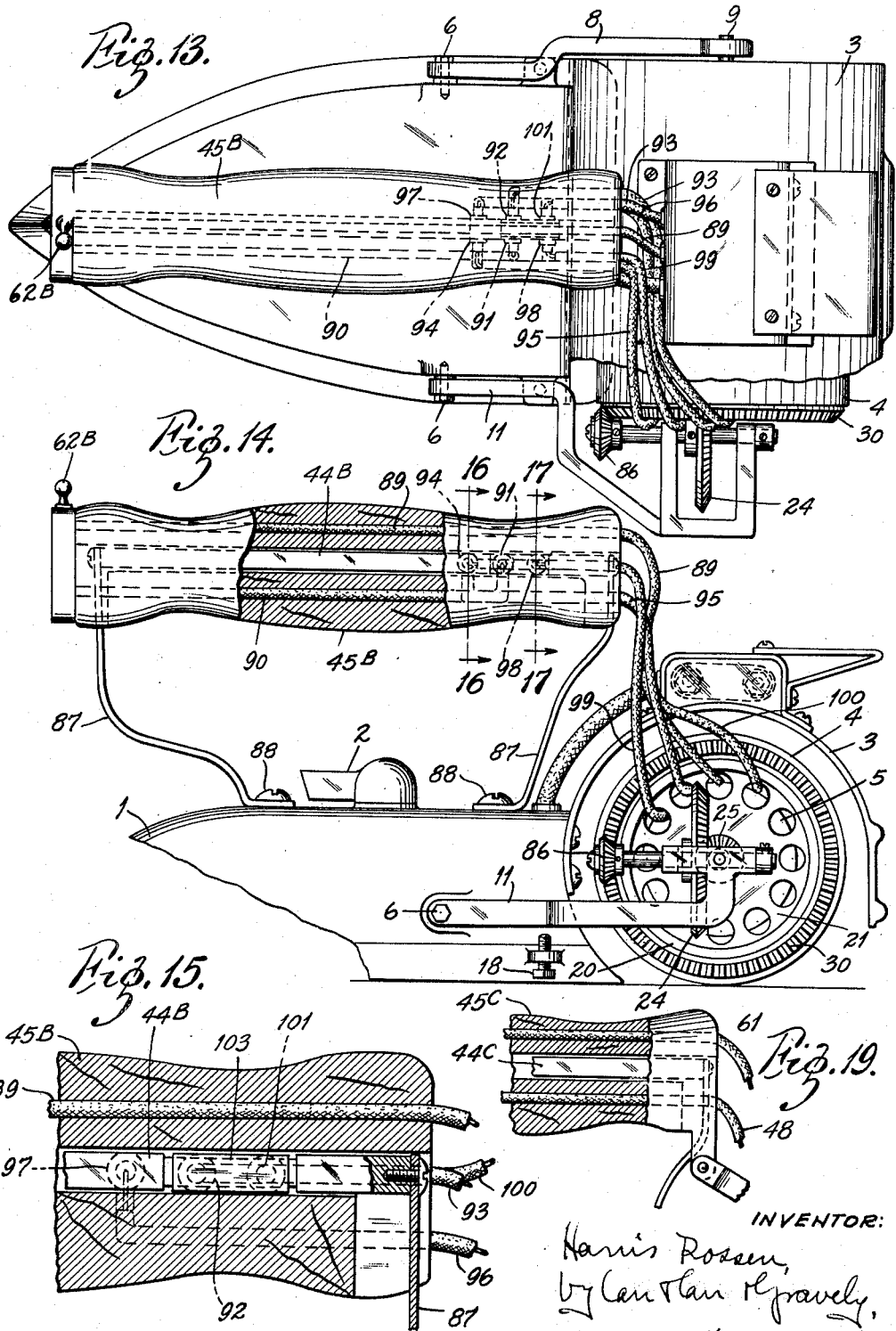

Patented June 27, 1939

2,164,085

UNITED STATES PATENT OFFICE 2,164,085

SELF-PROPELLED ELECTRIC IRON

Harris Rossen, St. Louis, Mo.

Application August 24, 1936, Serial No. 97,539

13 Claims. (Cl. 38—76)

My invention relates to self-propelled electric irons and has for its principal object an iron of that type which is simple and easy to operate, whose drive motor is automatically shut off when the iron is lifted and whose direction controlling mechanism is regulated by movements naturally associated with the desired direction of travel.

The invention consists in the self-propelled electric iron and in the parts and combinations and arrangements of parts hereinafter described and claimed.

In the accompanying drawings, wherein like reference numerals indicate like parts in the several views:

Fig. 1 is a top plan view of an iron embodying my invention, portions of the handle and the motor shield being broken away to show other parts;

Fig. 2 is a side elevation, with portions of the motor shield broken away;

Fig. 3 is an elevation of one side of the motor driven drum, with the adjacent portion of the handle shown in section;

Fig. 4 is a sectional view on the line 4—4 in Fig. 2;

Fig. 5 is a sectional view on the line 5—5 in Fig. 4;

Fig. 6 is a longitudinal sectional view of the middle portion of the handle, showing the automatic switch for controlling the motor current;

Fig. 7 is a sectional view on the line 7—7 in Fig. 6;

Fig. 8 is a detail end view of the portion of the linkage controlling the reversing mechanism that is associated with the handle;

Fig. 9 is a wiring diagram;

Fig. 10 is a side elevation, omitting the motor and drive mechanism of an iron having a modified form of handle and automatic control switch;

Fig. 11 is a sectional view on the line 11—11 of Fig. 10;

Fig. 12 is a sectional view of the automatic switch and its casing;

Fig. 13 is a top plan view of a modification having a reversible electric motor;

Fig. 14 is a side elevation of said modification, with a portion of the handle shown in longitudinal section;

Fig. 15 is a longitudinal sectional view through one end portion of the handle;

Fig. 16 is a sectional view on the line 16—16 in Fig. 14;

Fig. 17 is a sectional view on the line 17—17 in Fig. 14;

Fig. 18 is a wiring diagram; and

Fig. 19 is a longitudinal sectional view of a modified handle construction for the form shown in Figs. 1 to 9.

In the form shown in Figs. 1 to 9, an electric iron 1 provided with the usual control lever 2 for regulating the heat thereof has secured to its rear end a shield 3, preferably of curved form and arranged with its open side downwardly. Disposed in this shield 3 is a drum 4 or traction wheel in which is mounted an electric motor 5 that has suitable driving gear connections with said drum, the drum and motor being pivotally connected to the iron by a frame and the handle being provided with linkage for reversing the driving connections between the motor and the drum, all more fully described hereinafter.

Pivotally secured to one side of the iron, as by a screw 6, is a hanger bar 7 that has an outwardly offset portion 8 which extends along the end of said motor 5 and in whose rear end portion is journaled one end of the armature shaft 9 of the motor which extends through an opening 10 in the end of the traction drum 4. Pivotally secured to the other side of the iron as by a similar screw 6 is a hanger 11 which has an angularly disposed portion 12 extending beyond the reversing and drive mechanism mounted at the end of the drum.

At the rear end of said angularly extending portion 12 is a portion 13 that extends upwardly and at the top thereof a strip 14 that extends horizontally. Two arms 15 extend from said strip 14 toward the motor 5 and are provided with journal portions 16 through which extends a rotary shaft 17.

Stop screws 18 are mounted in lugs 19 near the bottom of the iron on either side to limit the downward movement of the respective hanger bars 7 and 11. Mounted in the driven end of the traction drum 4 is a sleeve 20 on which said drum rotates. Said sleeve 20 has an inner end wall 21 in which the other end portion 22 of the armature shaft 9 is journaled. Supporting rods 23 extending through said wall are secured to the motor 5 and to the arms 15.

Fixed on said shaft 17 between said arms 15 is a bevel gear 24 that meshes with a bevel pinion 25 on the end 22 of the motor armature shaft. The ends of the shaft 17 projecting outwardly beyond the arms 15 have splines 26 to receive slidable clutch members 27 that are adapted to mesh with cooperating clutch portions 28 of bevel gears 29 that mesh with a ring gear 30 on the end of the traction drum.

Extending upwardly from said armature are supporting strips 31 that are provided with openings 32 parallel to said splined shaft 17. Through said openings extends a slidable rod 33 to whose ends are fixed depending arms 34 that have forks 35 at their lower ends fitting in grooves 36 in the respective clutch portions. Thus, by sliding said rod 33, one or the other gear 29 may be given a driving connection with the motor, causing the traction drum 4 to travel forward or backward.

Fixed on the slidable rod 33 is an upwardly projecting arm 37 to which is pivotally secured one end of a link 38 whose other end 39 is pivotally secured to an ear 40 on a link 41. Said link 41 is pivotally secured at its lower end 42 to the iron and at its upper end 43 is pivotally secured to a supporting handle bar 44 which extends through a hollow grip piece 45. The forward end of said handle bar 44 is pivotally secured to a link 46 whose lower end 47 is pivotally secured to the top of the iron. By this arrangement, a forward movement of the grip 45, as would be natural in propelling the iron forward by hand, moves the linkage in a direction to cause the traction drum to be rotated in a forward direction, this gearing arrangement being indicated in Fig. 2. Rearward movement of the grip would cause the rod 33 to be moved rearwardly (to the right in Fig. 2) so as to disengage the left hand gear 29 and engage the right hand gear 29, thus driving the drum rearwardly.

In order to prevent racing of the motor 5 and traction drum 4 when the iron is lifted, an automatic motor cut-off switch is preferably provided. One form of automatic switch is illustrated in Figs. 2, 6 and 7. Running through the grip member 45 is one wire 48 of the motor circuit, which wire is divided and has its adjacent end portions secured to contact plates 49 in the grip member, as by screws 50. A contact button 51 is normally in contact with the lower sides of these contact plates 49 and has projecting upwardly therefrom a stem 52 with an enlarged head 53 at its upper end. An insulating washer 54 is mounted on the upper sides of the contact plates 49 and an insulating disk 55 is disposed between the head 53 at the top of the stem 52 and the handle bar 44. A spring 56 interposed between said head 53 and said insulating washer 54 normally forces the stem 52 upwardly so as to bring the contact button 51 in engagement with the contact plates 49. When the iron is lifted, the handle bar 44 drops downwardly in the longitudinal bore 57 of the grip member 45, which is larger than said handle bar 44, so that the stem 52 and contact button 51 are forced downwardly against the pressure of the spring 56, interrupting the circuit to the motor.

Fig. 9 is a complete wiring diagram for the modification shown in the preceding views. As indicated, the two contact points 58 of the socket member of the iron cooperate with the two contact portions 59 of a suitable plug. From one contact point 58, the current goes through the usual heating element 60, back to the other wire and contact point. From the first contact point, a wire 61 leads to the handle, where a switch 62 is provided for manually controlling the motor circuit, then through the automatic shut-off switch to the motor 5 and from the motor back to the other contact member.

In Figs. 10 to 12 is shown a modified form of automatic motor cut-off switch. In this construction, the grip member 45A is rigidly secured, as by screws 70 to a frame 71 which has a flat portion 72 disposed along the top of the iron and secured thereto by screws 73 extending through elongated slots 74 in said portion, so that the entire handle is slidable. The heads of said screws 73 are spaced from the tops of said slidable portion 72 so as to permit the iron to drop away from the handle when the grip 45A is lifted.

Secured to the iron as by screws 75 are brackets 76 of insulating material in which are mounted contact screws 77 that receive portions of a wire 78 that extends along the frame 71. Mounted on the housing, as by screws 79, is a cover 80 of insulating material having openings 81 through which portions of said wire extend. Mounted in the housing 76 above the contact screws 77 is a contact plate 82 which has a downwardly depending stem 83 of insulating material secured thereto and extending into engagement with the slidable portion 72 of the handle. Interposed between the contact plate 82 and the cover 80 is a spring 84 which forces the contact plate 82 downwardly into engagement with the contact screws 77. Obviously, when the handle is lifted, the iron drops and the handle moves upwardly relative thereto, so that the pressure of the handle against said stem 83 forces the contact plate 82 away from the contact screws 77, against the pressure of the spring 84. Preferably, the motor and reversing mechanism of Figs. 10 to 12 will be the same as that of Figs. 1 to 9, the handle being provided with a link 39A for operating the reversing mechanism.

In the construction shown in Figs. 13 to 18, the motor itself is reversible. In this arrangement, the hanger frame for the motor and traction drum is provided with a single pinion 86 that meshes with the ring gear 30 of the drum, the clutches and other reversing drive parts being dispensed with. A reversing switch mechanism is incorporated in the grip member 45B of the handle which is slidable on a handle bar 44B. The handle bar 44B is provided with a supporting strip 87 at each end whose lower end is secured to the top of the iron as by a screw 88. Extending through the grip member 45B is the lead-in wire 89 for the reversing motor circuit, said wire being provided with a manual cut-off switch 62B. The portion 90 of the lead-in wire beyond said switch terminates in a contact button 91 that projects into the bore 57B of the grip member 45B. Directly opposite said contact button 91 is a contact button 92 from which extends the return wire 93 of said circuit. Extending into said bore on one side of said contact button 91 is a contact button 94 that is connected to a wire 95 that leads to the motor 5, the return wire 96 from the motor terminating in a contact button 97 opposite said button 94. On the other side of said lead-in contact button 91, a contact button 98 projecting into the bore is connected to a lead-in wire 99 for the other side of the electric motor, the return wire 100 therefrom terminating in a contact button 101 projecting into the bore opposite said button 98.

The handle bar 44B is provided with an insulating cover 102 and mounted on said cover are two contact strips 103 that are insulated from each other. The length of the strips 103 is such and the movement of the handle 45B is such that the respective strips 103 are always in contact with the main lead-in button 91 and return button 92, but with only the forward set or rear set of contact buttons of the motor circuits. Thus, when the handle is in its forward position, the main lead-in button 91, the main return button 92, the contact button 94 of the first motor circuit and the return button 97 of said first motor circuit will be in contact with the contact strips 103, thus operating the motor in the forward direction. When the handle is in the rearmost position, the other contact button 98 and return contact button 101 of the second motor circuit will be in contact with said strips 103, so that the motor will be operated in reverse.

In the modification shown in Fig. 19, the handle construction includes a grip member 45C that is slidable on a fixed handle bar 44C, said grip member being connected with a reversing mechanism of the type shown in Figs. 1 to 9.

The above described construction minimizes the work of ironing, providing a means for propelling the iron forward and backward. Pressure on the handle in the desired direction of travel causes the iron to travel in that direction, thus avoiding the risk of operating a switch to cause the iron to travel in the wrong direction. An automatic cut-off is provided to prevent racing of the motor when the iron is lifted. The swivel connection of the motor supporting frame with the iron allows the iron to accommodate itself to different thicknesses of material. Obviously, numerous changes may be made without departing from the invention and I do not wish to be limited to the precise construction shown.

What I claim is:

1. In combination, an electric iron having a handle mounted for endwise movement in either direction, hanger bars pivotally secured to said iron, a traction drum rotatably mounted between the ends of said hanger bars, an electric motor in said traction drum, means for supporting said motor, drive gearing connecting said motor and said traction drum and means responsive to the direction of endwise movement of said handle for controlling the direction of rotation of said drum, said means including members actuated by either of the endwise movements of said handle.

2. In combination, an electric iron having a handle mounted for endwise movement in either direction, hanger bars pivotally secured to said iron, a traction drum rotatably mounted between the ends of said hanger bars, an electric motor in said traction drum, means for supporting said motor, drive gearing including reverse drive mechanism connecting said motor and said traction drum, linkage responsive to the direction of movement of said handle for controlling said drive gearing including a link connected to said handle and actuated by either of the endwise movement thereof for controlling the direction of drive.

3. In combination, an electric iron having a handle mounted for endwise movement in either direction, hanger bars pivotally secured to said iron, a traction drum rotatably mounted between the ends af said hanger bars, an electric motor in said traction drum, means for supporting said motor, drive gearing connecting said motor and said traction drum, means actuated by either of the endwise movements of said handle for controlling the direction of rotation of said drum, and means actuated by lifting said iron for shutting off said motor.

4. In combination, an electric iron having a handle mounted for endwise movement in either direction, hanger bars pivotally secured to said iron, a traction drum rotatably mounted between the ends of said hanger bars, an electric motor in said traction drum, means for supporting said motor, drive gearing connecting said motor and said traction drum, means actuated by either of the endwise movements of said handle for controlling the direction of rotation of said drum, said iron and said handle being permitted relative vertical movement when the iron is vertically raised from a work support into inoperative position and a switch member normally closed by spring pressure and opened by said relative movement to shut off the motor.

5. In combination, an electric iron having a handle slidable in either direction, a traction drum rotatably mounted at the rear end of said iron, an electric motor in said traction drum, means for supporting said motor, drive gearing connecting said motor and said traction drum, and means actuated by either of the movements of said handle for controlling the direction of rotation of said drum.

6. In combination, an electric iron having a grip member connected by links at each end to said iron, whereby said grip may be moved back and forth, a traction drum rotatably mounted at the rear end of said iron, an electric motor supported in said traction drum, drive gearing connecting said motor and said traction drum, including clutches for controlling the direction of rotation of said drum and linkage controlled by either of the movements of said grip for actuating said clutches.

7. In combination, an electric iron having a handle mounted for endwise movement, a traction drum rotatably mounted at the end of said iron, an electric motor in said traction drum, means for supporting said motor, a ring gear secured to one end of said traction drum, a pinion on the end of the armature shaft of said motor, a gear meshing with said pinion, a shaft to which said gear is fixed, the ends of said shaft being splined, clutch members slidably mounted on said splined portions, gears on the ends of said shaft in mesh with said ring gear, said gears having clutch portions cooperating with said clutch members, a slidable rod having depending arms for operating said clutch members respectively, and a link pivotally connected to said handle and to said rod for moving said rod.

8. An electric iron having a fixed handle, a hollow grip mounted on a portion of said handle for endwise movement in either direction, a reversible motor, means driven by said motor for propelling said iron and switches actuated by either of the movements of said grip on said fixed handle for controlling the direction of rotation of said motor.

9. An electric iron having a fixed handle including a horizontal handle bar, a hollow grip mounted on said handle bar for endwise movement in either direction, a reversible electric motor, means driven by said motor for propelling said iron, an electric circuit including contact buttons mounted in said grip on opposite sides of the hollow bore thereof and projecting into said bore, pairs of contact buttons mounted in said grip on either side of said first named contact buttons, each pair of said second named contact buttons forming part of a circuit through said motor, said circuits operating said motor in opposite directions and contact strips mounted on said handle bar, each connecting one of said first named contact buttons selectively with one of said second named contact buttons.

10. An electric iron having a fixed handle including a horizontal handle bar, a hollow grip mounted on said handle bar for endwise movement in either direction, a reversible electric motor, means driven by said motor for propelling said iron, an electric circuit including contact buttons mounted in said grip on opposite sides of the hollow bore thereof and projecting into said bore, pairs of contact buttons mounted in said grip on either side of said first named contact buttons, each pair of said second named contact buttons forming part of a circuit through said motor, said circuits operating said motor in opposite directions and contact strips mounted on said handle bar and insulated from each other and from said handle bar, each strip connecting one of said first named contact buttons selectively with one of said second named contact buttons when said grip is moved in one direction.

11. In combination, an electric iron having a handle mounted for endwise movement in either direction, a traction drum rotatably mounted at the rear end thereof, an electric motor in said traction drum, means for supporting said motor, and means for controlling the direction of rotation of said traction drum, said means including members actuated by either of said endwise movements of said handle.

12. In combination with an electric iron having an electric motor and means driven by said motor for propelling it, a circuit for said motor and means responsive to vertical lifting of the iron from a work support for opening said circuit to stop the motor.

13. In combination with an electric iron having an electric motor and means driven by said motor for propelling it, a circuit for said motor, a handle for said iron and a switch for said motor circuit positioned for opening in response to vertical lifting of said iron by said handle from a work support.

HARRIS ROSSEN.